(No Model.)
J. A. LATTA.
ANIMAL TRAP.
No. 425,136.  Patented Apr. 8, 1890.
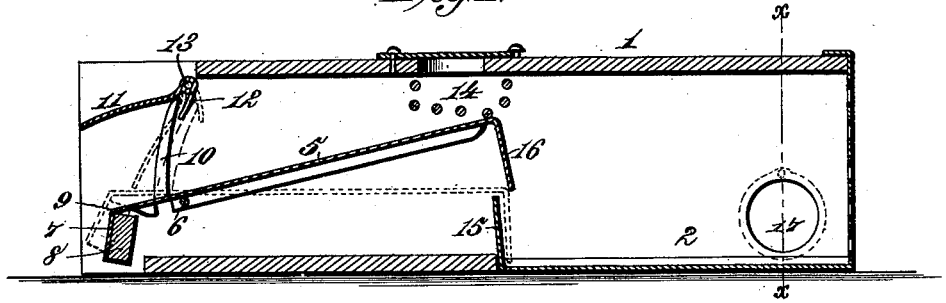
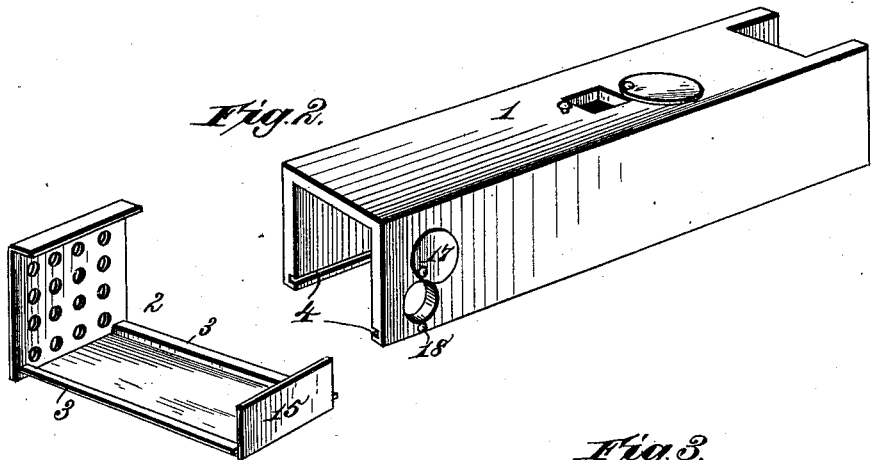
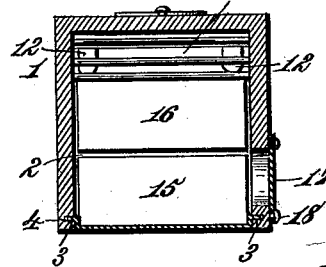
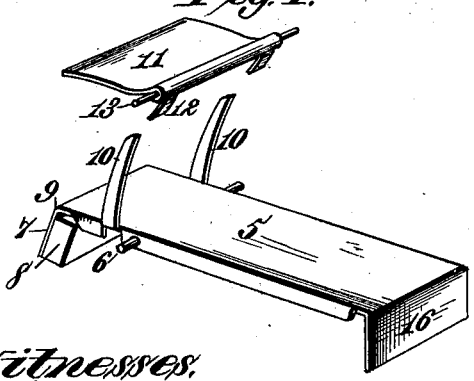
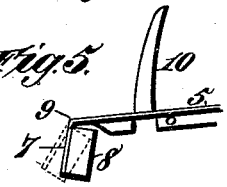
Witnesses,
Robert Everett
J. A. Rutherford
Inventor:
John A. Latta,
By James L. Norris.
Atty.

UNITED STATES PATENT OFFICE.

JOHN A. LATTA, OF LINCOLN, NEBRASKA.

ANIMAL-TRAP.

SPECIFICATION forming part of Letters Patent No. 425,136, dated April 8, 1890.

Application filed July 8, 1889. Serial No. 316,809. (No model.)

*To all whom it may concern:*

Be it known that I, JOHN A. LATTA, a citizen of the United States, residing at Lincoln, in the county of Lancaster and State of Nebraska, have invented new and useful Improvements in Animal-Traps, of which the following is a specification.

This invention relates to that type of animal-traps wherein a tilting platform connected with the trap-door is overbalanced by the weight of an entering animal to close the door and is restored to its normal position by a weight to automatically reset the trap when the animal leaves the platform and enters the cage-box. In such traps the inner end of the platform when in its normal position is elevated some distance from the bottom wall of the cage or trap casing, and consequently it frequently occurs that the trap is rendered inoperative by reason of the animal passing from the cage to a position beneath the elevated inner end of the platform, and thereby interfering with the correct working of the parts.

In traps especially intended for trapping mice or rats the cage-box in rear of the platform is usually a permanent and immovable fixture of the trap-casing, and consequently cannot be conveniently cleaned, especially where the structure is small and of wood, for trapping mice. In consequence of this the cage-box soon becomes foul and emits the odor of the animal, and mice will not therefore enter the trap.

The object of my invention is to avoid the foregoing objections by providing means to prevent the animal passing beneath the platform and making the cage-box so that it can be conveniently removed, cleaned, and replaced.

The invention also has for its objects to provide novel means for operating the trap-door by the tilting of the platform, to provide novel means for attaching the counterbalance-weight to the platform, whereby the weight can be easily moved to secure the required disturbance of equilibrium, and to provide novel and simple means for securing the pivoted exit-doors of the trap.

The objects of my invention I accomplish by the features of construction and combination of devices hereinafter described and claimed, reference being made to the accompanying drawings, in which—

Figure 1 is a longitudinal sectional view of a trap embodying my invention; Fig. 2, detail perspective views of the trap-casing and metal cage separated from each other; Fig. 3, a sectional view taken on the line $x\, x$, Fig. 1; Fig. 4, detail perspective views of the tilting platform and trap-door; and Fig. 5, a detail view of the front end of the platform, showing by dotted lines the counterbalance-weight adjusted forward to increase its leverage of the platform.

In order to enable those skilled in the art to make and use my invention, I will now describe the same in detail, referring to the drawings, where—

The numeral 1 indicates the casing of the trap, which is preferably composed of wood and comprises two side walls, a top wall, and a bottom wall, which, as here shown, terminates at or adjacent to the middle of the casing to create a space, which is occupied by the bottom wall of a cage 2, that comprises a vertical end wall having numerous perforations, and is flanged at its upper end to engage the top of the wood casing. The bottom wall of the cage is provided at each side with a longitudinal flange or rib 3, extending laterally and adapted to slide in the longitudinal grooves 4 in the sides of the casing, whereby the cage can conveniently slide into and out of place, while such cage constitutes the rear end wall of the trap-casing and a portion of the bottom wall thereof, which construction greatly facilitates cleaning the entire structure and enables it to be conveniently kept in order to secure the best results.

The tilting platform 5 is preferably composed of a metal plate and is pivoted adjacent to its front end, as at 6, the extreme front end being bent downward into an adjustable flange 7, to which is secured in any suitable manner the counterbalance-weight 8. The flange is adjustable by moving it back and forth on its bend 9 as a pivot, as indicated in Fig. 5, for the purpose of giving the required disturbance of equilibrium.

The platform is provided with vertically-projecting arms 10, having curved extremities bearing against the under side of the trap-door 11 and engaging the pendent lugs 12 on the latter, such door being movable with or on a shaft or wire 13, journaled in or fixed to the casing, all in such manner that the animal in moving along the platform to reach the bait in the bait-holder 14 overbalances the forward end of the platform, thus throwing the upper ends of the arms 10 rearward and downward. This movement of the arms releases the door and may move the lugs 12 rearward and force the door to swing downward to its closed position, as represented by the dotted lines, Fig. 1; but obviously the door will descend by gravity as the upper ends of the arms 10 move rearward and downward. The instant the animal leaves the platform and enters the movable cage the counterbalance-weight lowers the front end of the platform and causes the arms 10 to move forward and upward, thus pressing the door upward to its open position, as represented by the full lines, Fig. 1. When the animal overbalances the platform and the door is closed, it is necessary to prevent the door being opened, as might occur if the animal moved against the door while on the platform.

The means for preventing the door being opened while the inner end of the platform is lowered consists of the lugs 12, engaging the rear edges of the arms 10, since the latter prevent the lugs moving forward so long as the inner end portion of the platform is depressed.

It will be obvious that one arm 10 and one lug 12 could be omitted and a single arm and a single lug be employed.

To prevent the possibility of the trapped animal passing beneath the inner end of the platform and interfering with the correct working thereof, I provide a guard which closes the rear part of the space beneath the platform and prevents communication between the cage and such space. This guard must be of such construction that the inner end of the platform can freely rise and fall without obstruction, and to accomplish this the guard here shown is composed of a vertical flange 15, rising from the bottom of the cage 2 at its front end, and a pendent flange 16 on the inner end of the platform movable with the latter at one side of the flange 15. The platform is economically made of sheet metal, formed in one piece, with its end flanges and door-operating arms; but I do not confine myself to this particular form of platform.

The access-opening for the bait-holder and the exit-opening for the cage are each furnished with a door composed of a disk 17, pivoted adjacent to its edge to the casing and swinging in a plane parallel to the latter to cover and uncover the openings, while the edge of each door in its turning movement engages under the stationary head 18 of a pin or nail driven into the casing. By the construction shown the metallic cage can be slid out of the casing for the purpose of conveniently and thoroughly cleaning it to remove that odor which makes the animal suspicious and leads it to avoid entering the trap.

The cage is composed of a single piece of metal stamped or struck up with the longitudinal flanges or ribs, guard-flange, and perforated wall.

The bait-holder is composed of wires, as usual; but it may be of any suitable construction.

While I have described the trap-casing of wood, it is evident that other material and other forms of casings can be employed; and, further, while I have shown the flange 15 as forming a part of the removable cage, I do not confine myself thereto.

Having thus described my invention, what I claim is—

1. The combination, with the casing of an animal-trap, of a removable and replaceable animal-cage sliding lengthwise into the casing between the opposite side walls thereof, substantially as described.

2. The combination, with a trap-casing having a door and a platform which closes and opens the door, of a removable and replaceable cage located in the casing behind the platform and sliding lengthwise into the casing between the opposite side walls thereof, substantially as described.

3. The combination, with a trap-casing having its opposite side walls each provided on its inside with a horizontal groove, a door, and a platform which closes and opens the door, of a movable cage having lateral flanges or ribs sliding in the horizontal grooves, substantially as described.

4. The combination, with a trap-casing having an opening and closing door, of a removable and replaceable cage located in the rear of and constituting the end wall and a portion of the bottom wall of the casing, substantially as described.

5. The combination, with a trap-casing and a trap-door, of a platform adapted to open and close the door and provided at its inner end with a pendent flange, and a cage located in rear of the platform and having a stationary vertical flange co-operating with the flange on the platform to form a guard, substantially as described.

6. The combination, with a trap-casing, of a swinging door pivoted at its upper end in the casing and a tilting platform having at its side edge an upwardly-projecting arm bearing against the door in front of the pivot thereof and acting to press the door upward to its open position for resetting the trap when the front end of the platform descends, substantially as described.

7. The combination, with a trap-casing and a hinged door, of a tilting platform having at its front end a depending flexible flange carrying a counterbalance-weight, said flange being bendable back and forth to give the required disturbance of equilibrium, substantially as described.

8. The combination, with a trap-casing and a hinged door, of a tilting platform having at its front end a bent flange carrying a counterbalance, said flange being adjustable backward and forward on its bend to throw the weight nearer to or farther from the pivot of the platform, substantially as described.

9. The combination, with a trap-casing, of a door having a pendent lug, and a tilting platform having an arm bearing against the door in front of the lug and in advance of the door-pivot, substantially as described.

In testimony whereof I have affixed my signature in presence of two witnesses.

JOHN A. LATTA.

Witnesses:
G. W. JOHNSON,
A. M. DAY.